US010540857B1

(12) United States Patent
Day et al.

(10) Patent No.: US 10,540,857 B1
(45) Date of Patent: Jan. 21, 2020

(54) MULTIFUNCTION INTERFACE DEVICE FOR A SELF-SERVICE TERMINAL

(71) Applicant: NCR Corporation, Duluth, GA (US)

(72) Inventors: Phil Noel Day, Fife (GB); Steven James Birnie, Dundee (GB); Elina Inkeri Jokisuu, Arbroath (GB); Margaret McKendry, Carnoustie (GB); Marshall Munro, Dunfermline (GB); Andrew William Douglas Smith, Dundee (GB); Steve Swaine, Perth (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/022,973

(22) Filed: Jun. 29, 2018

(51) Int. Cl.
*G07F 19/00* (2006.01)
*G06F 3/0488* (2013.01)
*G07F 7/08* (2006.01)
*G07F 7/10* (2006.01)

(52) U.S. Cl.
CPC .......... *G07F 19/201* (2013.01); *G06F 3/0488* (2013.01); *G07F 7/0886* (2013.01); *G07F 7/10* (2013.01); *G07F 19/205* (2013.01); *G07F 19/206* (2013.01)

(58) Field of Classification Search
CPC ........ G07F 19/201; G07F 7/10; G07F 19/206; G07F 19/205; G07F 7/0886; G06F 3/0488
See application file for complete search history.

(56) References Cited

U.S. PATENT DOCUMENTS

| 6,731,778 | B1* | 5/2004 | Oda ................... G06Q 20/1085 348/156 |
| 2006/0157567 | A1* | 7/2006 | Baumann ............ G06F 3/03547 235/451 |
| 2007/0138256 | A1* | 6/2007 | Coventry ................ G07F 19/20 235/379 |

OTHER PUBLICATIONS

U.S. Appl. No. 29/646,553, Day, Philip N., et al.

* cited by examiner

*Primary Examiner* — Seung H Lee
(74) *Attorney, Agent, or Firm* — Schwegman, Lundberg & Woessner

(57) ABSTRACT

To overcome the difficulties caused by variation in user interfaces from self-service terminal to self-service terminal, a self-service terminal can use a standardized interface device that is compatible with other terminal types and other regions. The interface device can be positioned on a housing and electrically coupled to the housing via a secure physical connection. Media readers can be integrated into the interface device. An encrypted touch-sensitive display can be integrated into the interface device and positioned on a front of the interface device. The touch-sensitive display can show prompts to initiate a transaction at the self-service terminal. The prompts can provide instructions for causing physical media to be read at any one of the media readers to produce identification data. A processor positioned in the housing can receive the identification data from the interface device via the secure physical connection.

18 Claims, 8 Drawing Sheets

MULTIFUNCTION INTERFACE DEVICE FOR A SELF-SERVICE TERMINAL

FIELD OF THE DISCLOSURE

The present disclosure relates generally to an interface device for a self-service terminal.

BACKGROUND OF THE DISCLOSURE

Self-service terminals can vary from application to application. For example, an automated teller machine can have a different user interface than an airline check-in terminal. Self-service terminals can also vary from region to region, depending on local regulations or preferences.

It can be burdensome keeping multiple sets of parts in inventory to service the differently-configured self-service terminals. It can also be confusing for a user, who is accustomed to a particular user interface, to operate a self-service terminal having a different user interface.

Figure 1:
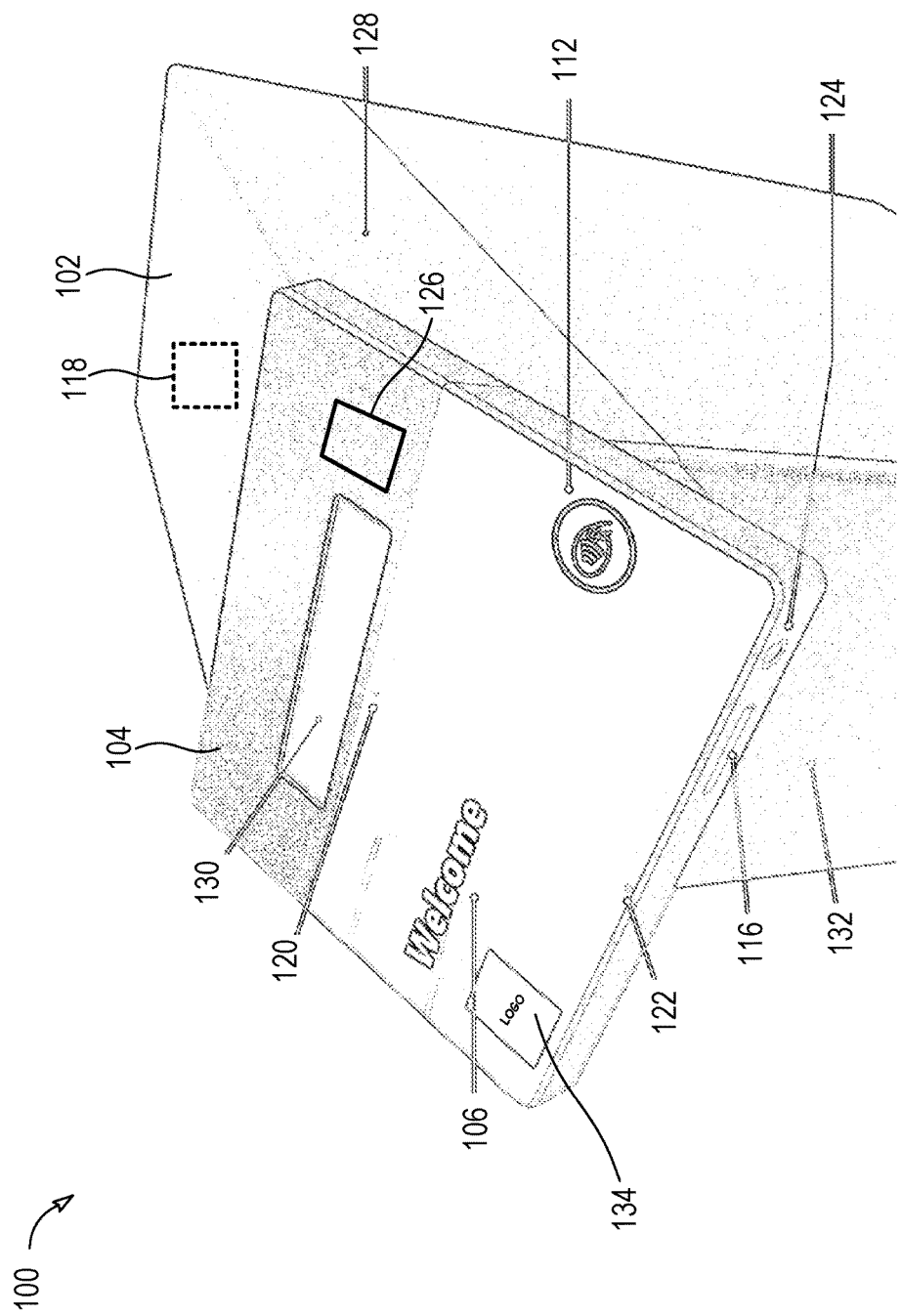
FIGS. 1 and 2 show two different views of an example of a walk-up self-service terminal, in accordance with some examples.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

To overcome the difficulties caused by variation in user interfaces from self-service terminal to self-service terminal, a self-service terminal can use a standardized interface device that is compatible with other terminal types and other regions.

Such a standardized interface device can reduce a number of parts kept in inventory to service a self-service terminal. For example, a typical automated teller machine can use a first type of multi-key keypad, while a typical airline check-in terminal can use a second type of multi-key keypad, different from the first type. The interface device discussed below can replace both the first and second types of keypads.

Such a standardized interface device can also simplify repairs to a self-service terminal. For example, the multi-key keypad of a typical automated teller machine can be difficult to access and, therefore, costly to replace. In contrast, the interface device discussed below can be relatively simple to replace.

Such a standardized interface device can also improve a user's experience at the self-service terminal, because elements of the interface device can have a similar appearance for multiple types of terminals. A user accustomed to an interface layout on a first type of terminal will see the same interface layout on a second type of terminal, and will easily figure out how to use the second type of terminal.

Figure 2:
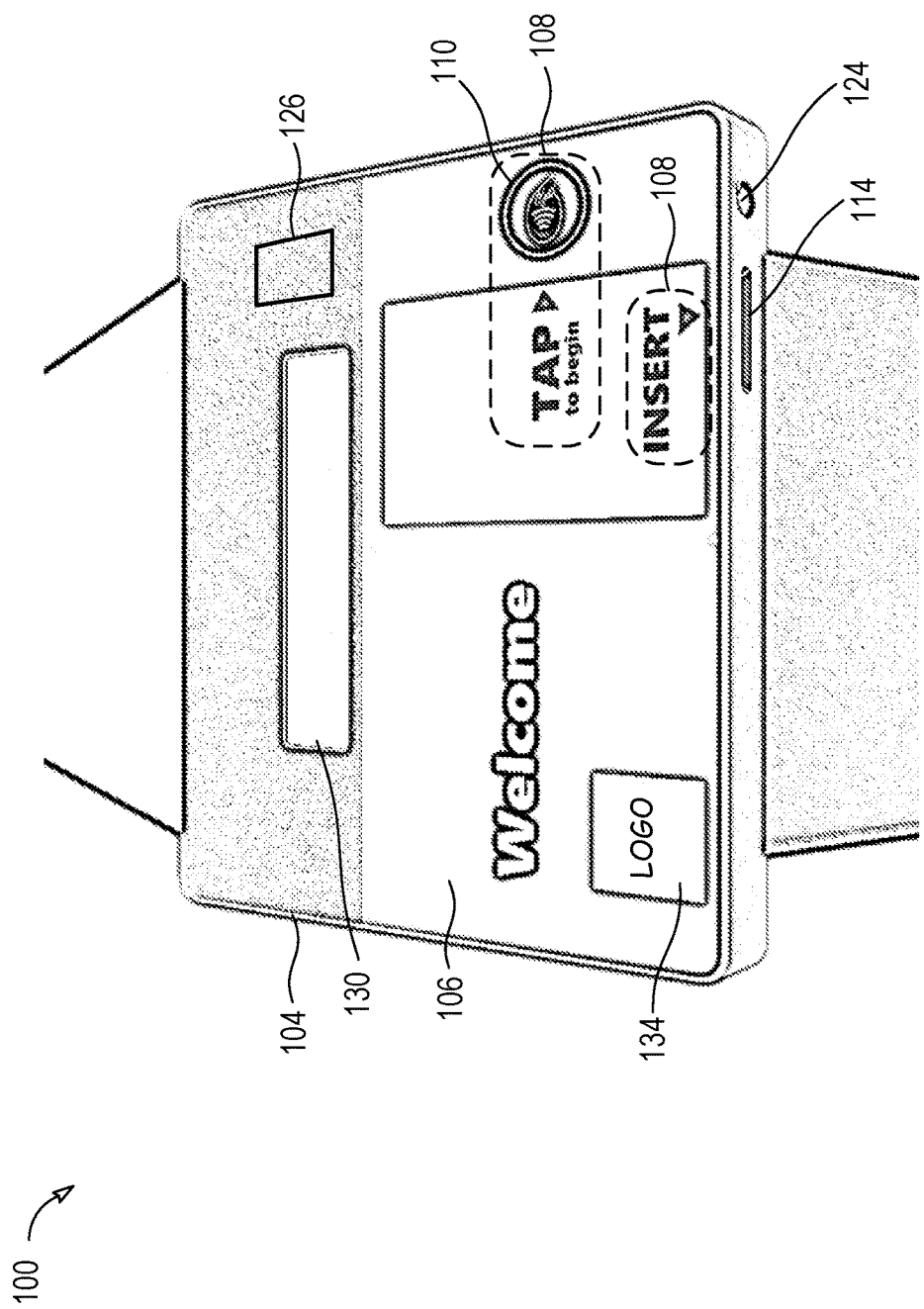

FIGS. 1 and 2 show two different views of an example of a walk-up self-service terminal 100, in accordance with some examples. The configuration of FIGS. 1 and 2 is but one example; other configurations can also be used.

The self-service terminal 100 can include a housing 102. The housing 102 can include an exterior shell for the self-service terminal 100, and can be formed from a relatively strong material to discourage tampering with the self-service terminal 100. In some examples, the housing 102 can be a stand-alone unit that can optionally be anchored to a floor. In other examples, the housing 102 can be anchored to a wall or other structure. In still other examples, the housing 102 can be protected by being on an opposite side of a wall from the user interface, such as for a through-the-wall configuration of an automated teller machine. In general, users of the self-service terminal 100 cannot access the interior of the housing 102.

A portion of the housing 102, known as a fascia, can include all the elements that interface with a user. For example, the fascia can include a display to provide instructions to a user, one or more buttons and/or a touch-sensitive screen to receive input from the user, a card reader and/or a contactless media reader, a camera, and a banknote slot. The interface device, discussed in detail below, can optionally replace most or all of these individual user-interface elements on the fascia.

An interface device 104 can be positioned on the housing 102, and, optionally, on the fascia of the housing 102. The interface device 104 can be electrically coupled to the housing 102 via a secure physical connection (e.g., a wired connection, rather than a wireless connection). In some examples, the interface device 104 can be formed as a computing unit, such as a tablet computer, with specialized hardware and software that increase the functionality and security beyond that of a typical tablet. In some examples, the interface device 104 can be planar. In some examples, the interface device 104 has a front that faces a user during operation. In some examples, the interface device 104 has a back, opposite the front, that can be electrically connected to the housing 102 via the secure physical connection. In some examples, the interface device 104 can include encryption to automatically render information stored on the interface device 104 unreadable when the interface device 104 is detached from the housing 102. In some examples, the interface device 104 can include authentication to automatically confirm an authenticity of the interface device 104 when the interface device 104 attaches to the housing 102. In some examples, the authentication can start automatically when the interface device 104 attaches to the housing 102.

A touch-sensitive display 106 can be integrated into the interface device 104. In some examples, the touch-sensitive display 106 can be positioned on a front of the interface device 104. In FIGS. 1 and 2, the touch-sensitive display 106 is shown as extending from a left edge of the front of the touch-sensitive display 106 to a right edge of the touch-sensitive display 106; other configurations can also be used.

The touch-sensitive display 106 can display information to a user, such as instructions or menu choices, during transactions at the self-service terminal 100. In FIG. 1 and subsequent figures, the touch-sensitive display 106 is shown as displaying a company logo 134; the touch-sensitive display 106 can also display other indicia, as needed, to provide instructions or reinforce a brand name.

The touch-sensitive display 106 can also receive touch-selections from the user, such as menu choices or selected alphanumeric characters, during transactions at the self-service terminal 100. The touch-sensitive display 106 can be encrypted, such that data entered on the touch-sensitive display 106 cannot be intercepted by a nefarious third party.

To initiate a transaction at the self-service terminal 100, the touch-sensitive display 106 can show one or more prompts 108 that instruct a user to take particular actions. In some examples, the prompts 108 can provide instructions for causing physical media to be read at any one of a plurality of media readers (discussed below) to produce identification data.

For example, a prompt 108 can show a contactless media reader icon 110 on the touch-sensitive display 106, optionally with an alphanumeric message, such as "Tap to begin". Such a prompt 108 can instruct a user to position contactless media, such as a radio-frequency identification chip-embedded card or a smart phone, at or near the icon 110 on the touch-sensitive display 106. A contactless media reader 112, such as a radio-frequency identification reader, can be positioned on or in the interface device 104. The contactless media reader 112 can read identification data from contactless media that is positioned at the front of the interface device 104 proximate the contactless media reader icon 110. The identification data read from the contactless media can be used to verify an identity of the user, and can be used to allow access to a user's account and other saved information.

As another example, a prompt 108 can show instructions to insert a card into a card slot 114 on the interface device 104. In some examples, the card slot 114 can be positioned along a lateral edge of the interface device 104. In some examples, the lateral edge can extend around a perimeter of the front of the interface device 104. In some examples, the lateral edge can be orthogonal to the front of the interface device 104. In some examples, the card slot 114 can be positioned on a bottom of the interface device 104. In some examples, the card slot 114 can extend into the interface device 104 along a direction parallel to the front of the interface device 104. A card reader 116, such as a radio-frequency identification card reader or a magnetic stripe reader, can be positioned on or in the interface device 104. The card reader 116 can read identification data from a card that is inserted into the card slot 114 on the interface device 104. The identification data read from the inserted card can also be used to verify an identity of the user, and can be used to allow access to a user's account and other saved information.

In some examples, either causing the contactless media to be read or causing the inserted card to be read can initiate a transaction at the self-service terminal 100. Performing either of these tasks can cause the identification data to be read by the interface device 104 through one of the media readers 112, 116. A processor 118 positioned either in the housing 102, or in or proximate the display 106, can receive, via the secure physical connection with the interface device 104, the identification data read from the contactless media or the inserted card. The processor 118 can then automatically (e.g., without prompting from a user) communicate the identification data to a remote server, via a secure physical connection, to verify an identity of the user and/or allow access to one or more accounts associated with the identification data.

The interface device 104 can include additional features to increase security and/or increase the functionality of the self-service terminal 100.

An upper camera 120, or cameras, can be used for facial recognition of the user. The upper camera 120 can capture an upper video stream through the front of the interface device 104. The upper video stream can have an upper field of view positioned to capture a face of the user. For example, the upper field of view can include a volume in which the user's face is positioned during a transaction at the self-service terminal 100. The upper field of view can include a user's face for a range of typical user heights, so that the upper portions of tall users' faces or the lower portions of short users' faces are not cut off. In some examples, the upper camera 120 can be positioned at or near a top edge of the front of the interface device 104. In some examples, the upper camera 120 can be positioned above the touch-sensitive display 106 on the front of the interface device 104. The facial recognition can be performed by a processor included with the interface device 104, a processor 118 included in the housing 102, a server accessed via a secure physical connection from the housing 102, or any combination of these.

A lower camera 122, or cameras and other sensors, can be used for imaging objects that are positioned near a user's hands, such as hand-held documents, items or documents with bar codes, and others. For example, the lower camera 122 can capture a lower video stream through the front of the interface device 104. The lower video stream can have a lower field of view positioned to capture a hand of the user, or a portion of the user at typical hand-height during a transaction at the self-service terminal 100. In some examples, the lower camera 122, or cameras and sensors, can detect the depth of objects in order to better differentiate between foreground and background images (such as a white document held up against a white background). In some examples, the lower camera 122 can be positioned below the upper camera 120 on the front of the interface device 104. In some examples, the lower camera 122 can be positioned at or near a bottom edge of the front of the interface device 104. In some examples, the lower camera 122 can be positioned below the touch-sensitive display 106 on the front of the interface device 104. Positioning the cameras in this manner can assist in capturing the video streams at the suitable heights.

A private audio jack 124 can provide an audio signal for the visually impaired. A user can plug a set of headphones or earbuds into the audio jack 124 to hear the audio signal. In some examples, the audio signal can mimic instructions shown on the touch-sensitive display 106. In some examples, the audio jack 124 can be positioned on the lateral edge of the interface device 104, optionally next to the card slot 114. In some examples, the audio jack 124 can be positioned on the bottom of the interface device 104, optionally next to the card slot 114. In some examples, audio can be transmitted wirelessly, rather than through a dedicated audio jack 124.

An optional biometric reader 126 can capture a fingerprint or palm print of the user. Data corresponding to the captured fingerprint or palm print can be used to identify the user. The fingerprint or palm print recognition can be performed by a processor included with the interface device 104, a processor 118 included in the housing 102, a server accessed via a secure physical connection from the housing 102, or any combination of these. In some examples, such fingerprint and/or palm print capturing can be performed by the lower camera 122.

In some examples, the self-service terminal 100 can be an automated teller machine. The automated teller machine can include a cash recycler 128 positioned in the housing 102. The interface device 104 can include a banknote slot 130 that extends through the interface device 104 from the front of the interface device 104 to the back of the interface device 104. The banknote slot 130 can be sized and positioned to transport banknotes between the user and the cash recycler 128.

In some examples, the self-service terminal 100 can include additional lighting 132, which can aid users in dark environments. In some examples, the lighting 132 can optionally include one or more colors that match a company logo 134.

In some examples, such as the configuration shown in FIGS. 1 and 2, the interface device 104 can be inclined at an angle, such as between 25 and 35 degrees from vertical, 30 degrees from vertical, or another suitable value. In other examples, such as those shown in FIGS. 3 and 4, the interface device 104 can be vertically oriented.

Figure 3:
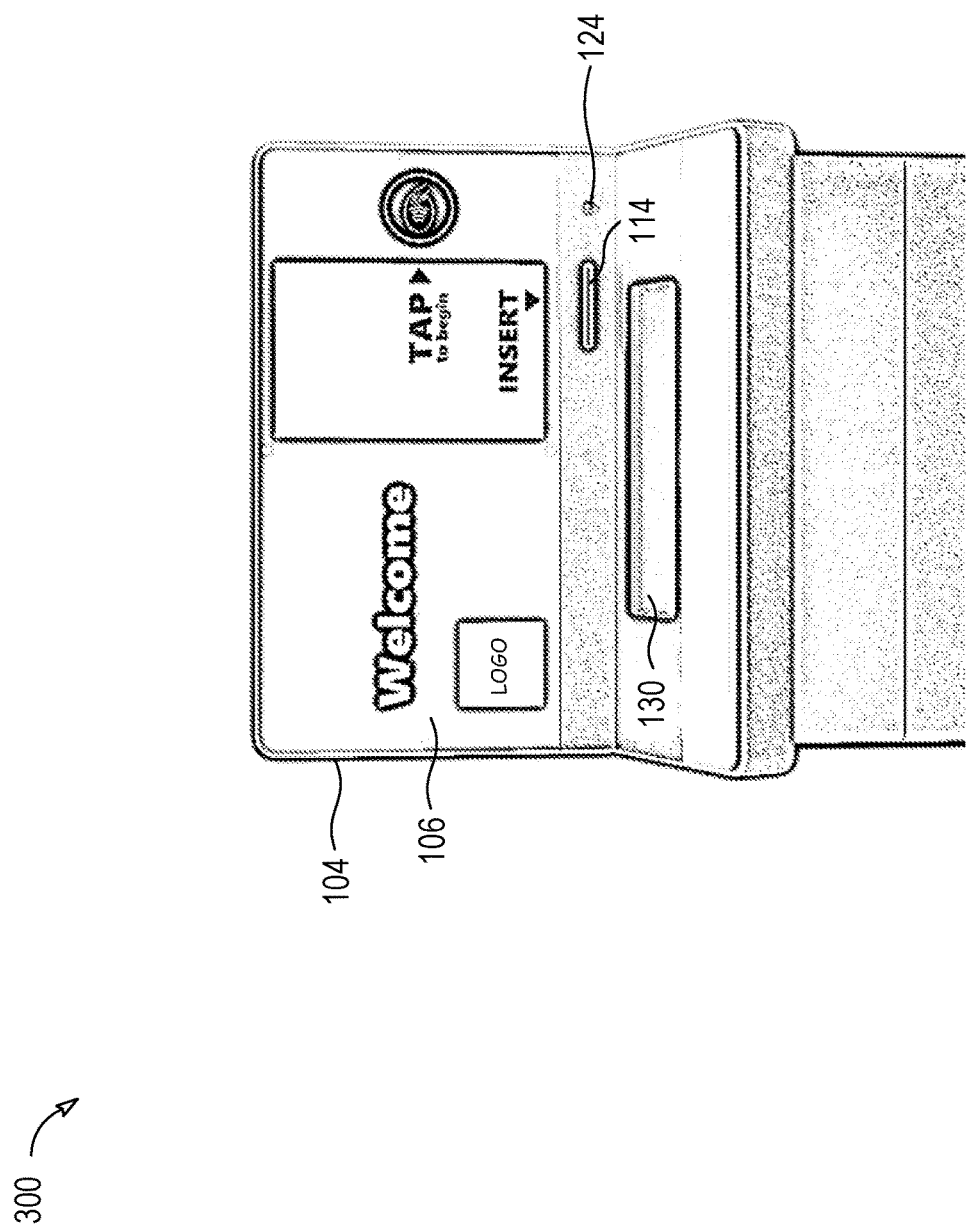
FIGS. 3 and 4 show two different views of an example of a drive-up self-service terminal, in accordance with some examples.
Figure 4:
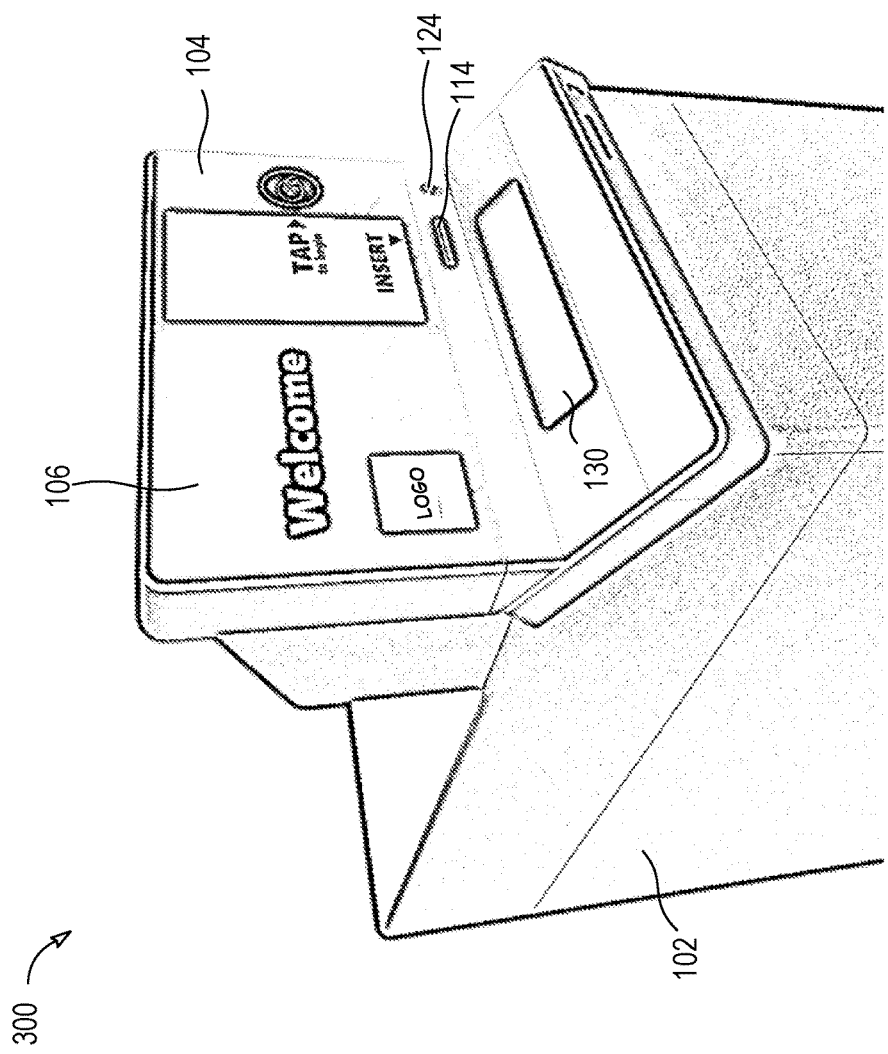

FIGS. 3 and 4 show two different views of an example of a drive-up self-service terminal 300, in accordance with some examples. In the configuration of FIGS. 3 and 4, the self-service terminal 300 is configured as a drive-up terminal, where the user sits in the user's car and operates the self-service terminal 300 through a window of the car.

Compared with the walk-up configuration of the self-service terminal 100, the self-service terminal 300 repositions the banknote slot 130 below the touch-sensitive display 106, so that bank notes can be more easily inserted and removed from the user's position through a car window. In addition, the self-service terminal 300 reorients the card slot 114 and the audio jack 124 so that insertion into the card slot 114 or the audio jack 124 is along a horizontal direction, which improves accessibility through the car window. In some examples, the self-service terminal can include two sets of card slots and audio jacks, with one set being in the same position and orientation as in the configuration of FIGS. 1 and 2.

Figure 5:
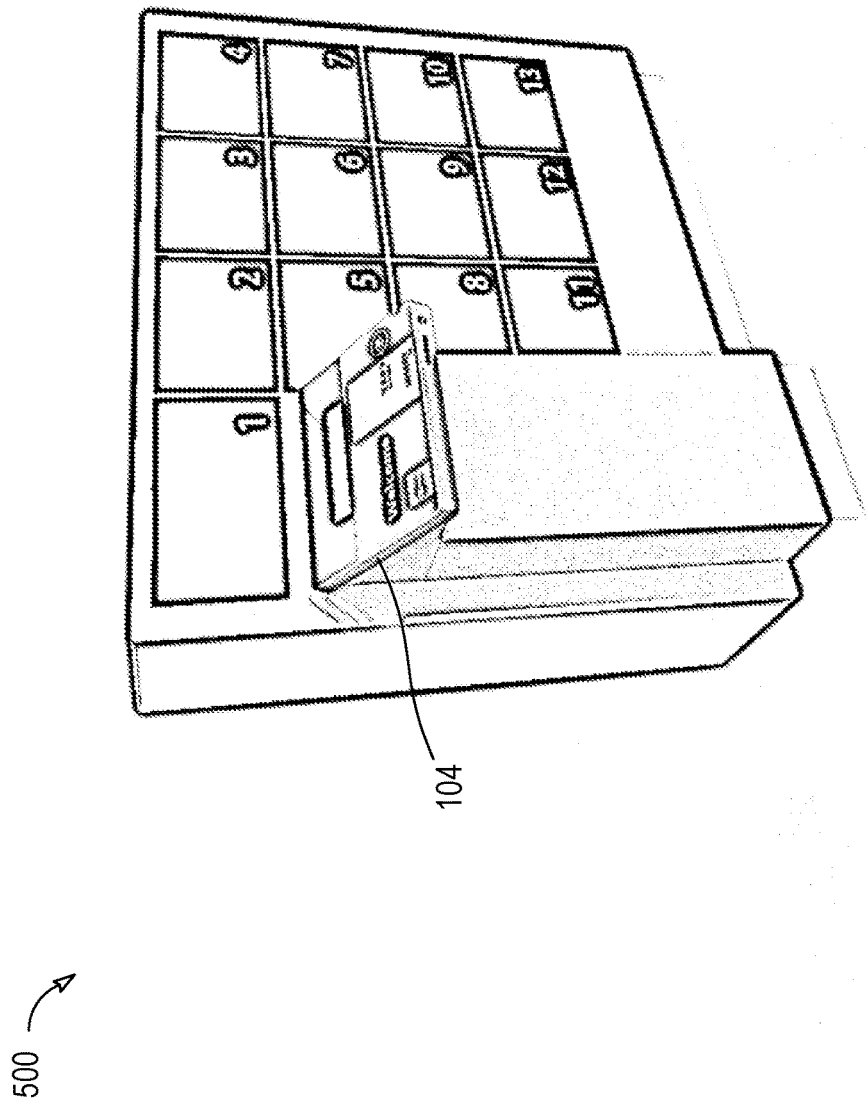
FIG. 5 shows an example of a self-service terminal, in which an interface device can control one or more electronic commerce lockers, in accordance with some examples.

FIG. 5 shows an example of a self-service terminal 500, in which an interface device can control one or more electronic commerce ("e-commerce") lockers, in accordance with some examples. The self-service terminal 500 can use the same interface device 104 shown in FIGS. 1 and 2. The process to initiate a transaction on the self-service terminal 500 can be the same as for the self-service terminal 100, including tapping contactless media or inserting a card. After a transaction has started, the transaction can include menu choices appropriate for e-commerce lockers.

Figure 6:
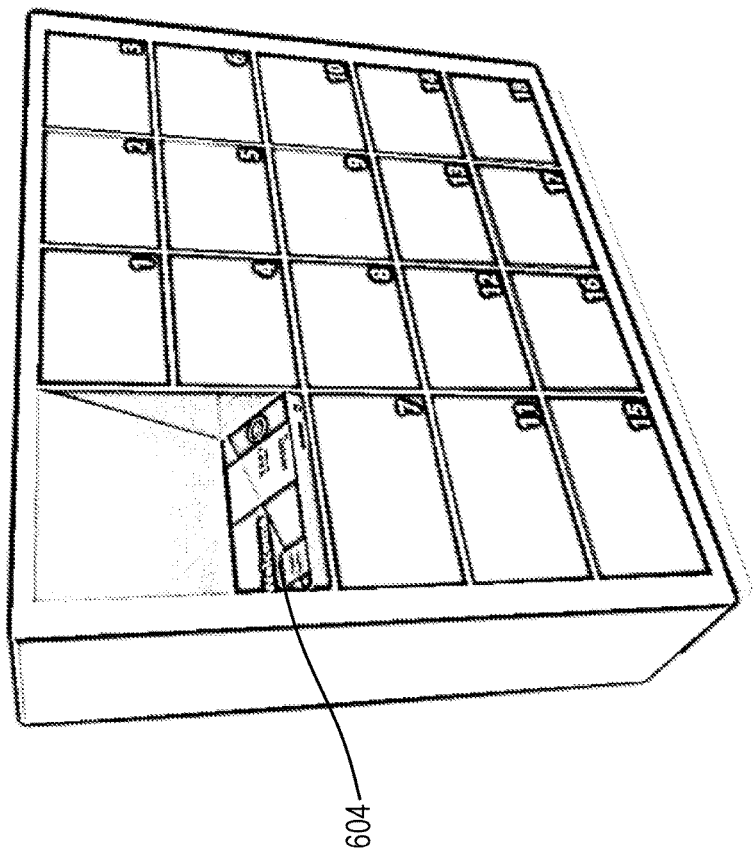
FIG. 6 shows another example of a self-service terminal, in which an interface device can control one or more electronic commerce lockers, in accordance with some examples.

FIG. 6 shows another example of a self-service terminal 600, in which an interface device can control one or more electronic commerce ("e-commerce") lockers, in accordance with some examples. Compared with the self-service terminal 500, the interface device 604 used with the self-service terminal 600 omits the banknote slot, but retains other elements of the interface device 104.

The walk-up, drive-through, and e-commerce locker configurations of FIGS. 1-6 are but three examples of application that can use an interface device to replace discrete input device components, such as a dedicated numeric keypad, a dedicated card reader, a dedicated contactless media reader, and so forth. Other applications can use the interface device as well.

Figure 7:
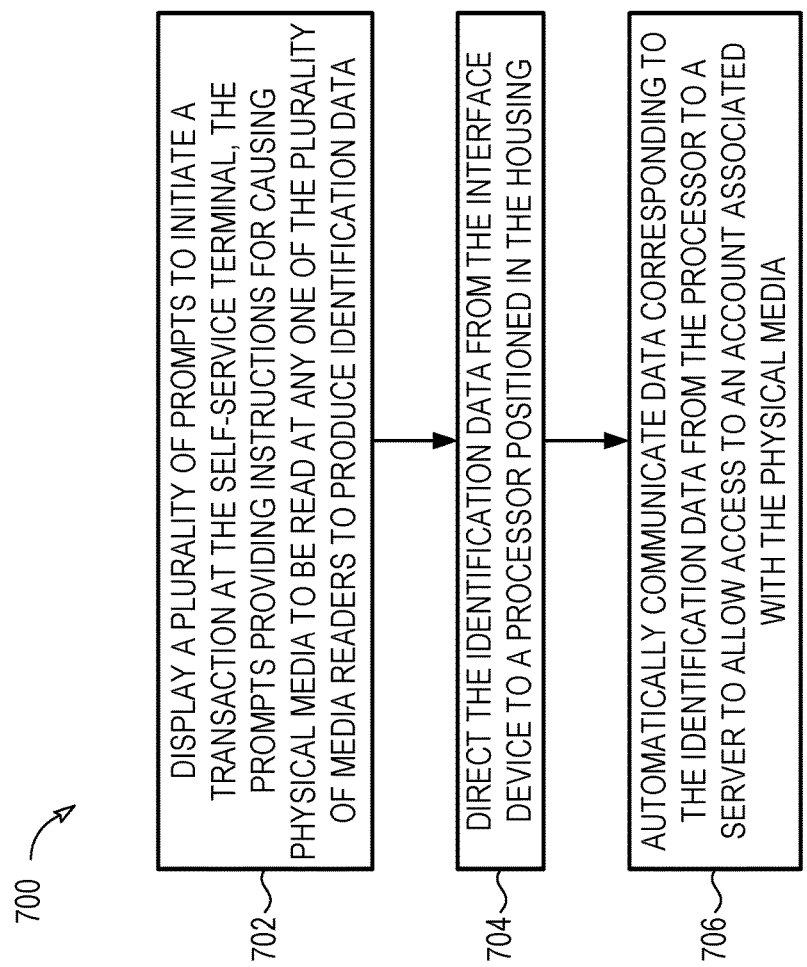
FIG. 7 shows a flowchart of an example of a method for initiating a transaction at a self-service terminal, in accordance with some examples.

FIG. 7 shows a flowchart of an example of a method 700 for initiating a transaction at a self-service terminal, in accordance with some examples. The self-service terminal can include an interface device positioned on a housing and electrically coupled to the housing via a secure physical connection. The self-service terminal can include a plurality of media readers integrated into the interface device. The method can be executed on any one of the self-service terminal shown in FIGS. 1-6, or on another suitable self-service terminal. Other suitable methods for initiating a transaction at a self-service terminal can also be used.

At operation 702, the self-service terminal can display, on an encrypted touch-sensitive display integrated into the interface device and positioned on a front of the interface device, a plurality of prompts to initiate a transaction at the self-service terminal, the prompts providing instructions for causing physical media to be read at any one of the plurality of media readers to produce identification data.

At operation 704, the self-service terminal can direct the identification data from the interface device, via the secure physical connection, to a processor positioned in the housing.

At operation 706, the self-service terminal can automatically communicate data corresponding to the identification data from the processor to a server to allow access to an account associated with the physical media.

It is instructive to discuss how a single interface device can be used across a line of products. For this discussion, the interface device can be referred to as an interaction shelf or a digital shelf. Multiple authentication, identification and input/output modules can be integrated into this single interaction shelf or digital shelf.

Modules can include, but are not limited to, an encrypted touchscreen offering leadthrough to the consumer (along with accepting input), conventional identification devices (such as contactless readers for both cards and near field communication (NFC) enabled smart devices, partial dip card readers), biometric identification devices (such as facial recognition, fingerprint, palm print and others), and accessibility features (such as private audio, either through a conventional 3.5 mm analogue audio socket, or through wireless audio transmission such as Bluetooth, Wi-Fi, or another transmission medium to send audio to remote headphones or smart devices). Most or all of these modules are largely non-mechanical (e.g., solid state), with few or no moving parts.

A single interaction shelf can be plugged securely into an automated teller machine (ATM) interface, regardless of configuration. For example, the same shelf being used in a front access lobby, rear access through-the-wall, a cantilevered branch/interactive banker terminal, or statement printing or card issuing terminals. With some modification to improve ergonomics, the same interaction shelf can also be used for a drive-up ATM, such as the configuration shown in FIGS. 3 and 4. The solid state design of the interaction shelf allows the shelf to be configured as a left, or right, or centered cantilever, which gives customers (e.g., banks or other financial institutions) a choice of different installation orientations (e.g., conventional front approach, left-hand cantilevered, or right-hand cantilevered). The interaction shelf can have a high level of modularity, and can be a common component in multiple different orientations for different ATM configurations. This shelf therefore can afford a broad level of adaptability of design. Such adaptability can benefit a manufacturer of the shelf, through commonality, cost saving, reduced parts count, and operational benefits. Such adaptability can also benefit a user of the shelf, through a streamlined, consistent user interface with all related modules being located in a single area.

In addition to ATMs, the same shelf can also be used in other industry segments, such as retail, where the shelf can be used as a combined display/payment/authentication module in the context of a self-checkout.

In some examples, the shelf can be installed at any one of a variety of depths (e.g., distance away from a wall or other structure). For example, in a through-the-wall installation, the shelf can be installed to protrude from the wall slightly, giving an element of toe clearance. As another examples, the shelf can be installed so that the shelf ends at the wall, giving a more recessed installation. Either of these example installations can be performed using the same hardware.

Such flexibility can allow installers of the shelf to satisfy installations requirements around the world, which can vary from region to region. For example, one country can require a knee well, while another country can place the fascia into a surround. Such flexibility can also allow the vertical height of the entire display to be significantly reduced, when compared to existing ATM designs.

Figure 8:
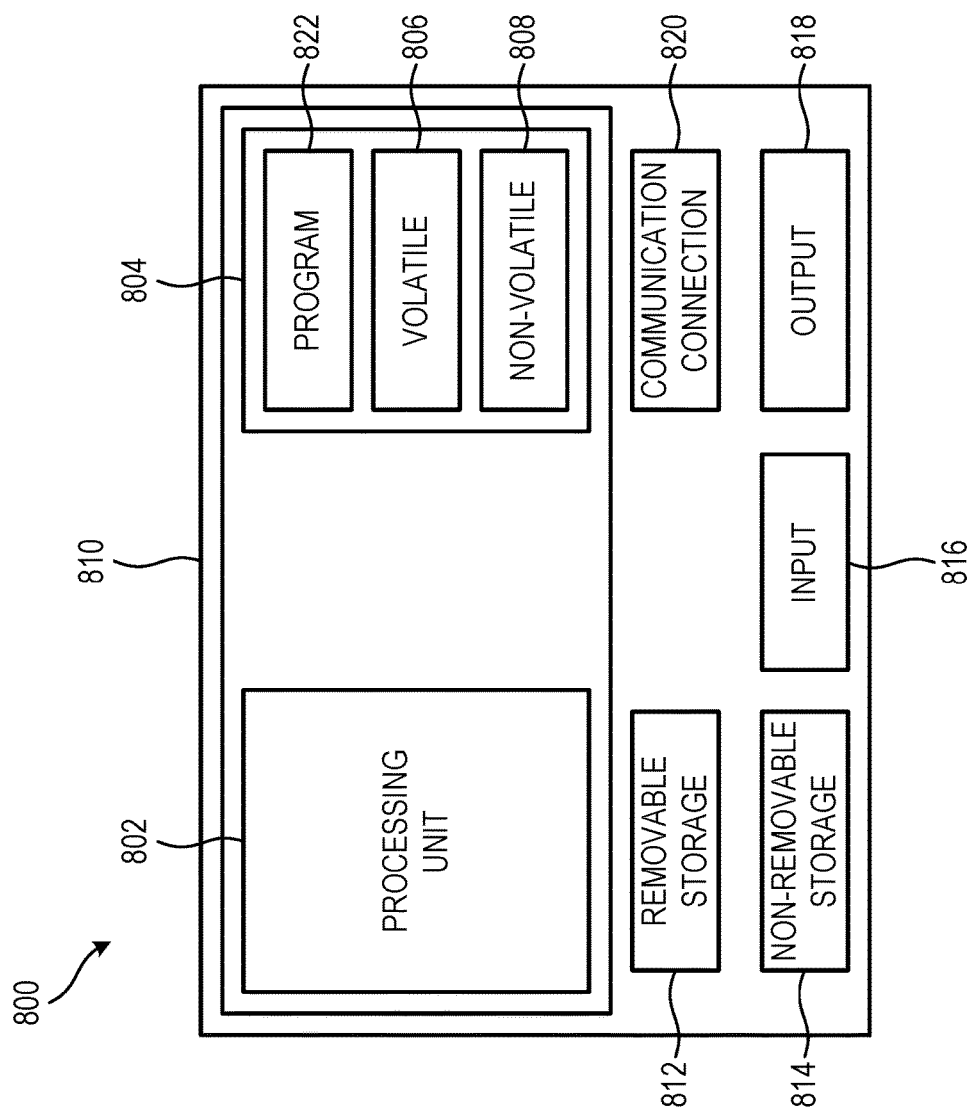
FIG. 8 shows a block diagram of an example of a controller, such as a self-service terminal, in accordance with some examples.

FIG. 8 shows a block diagram of an example of a controller 800, such as a self-service terminal, in accordance with some examples. The controller 800 can be part of a system that includes an interface device, a sleeve, fascia, shutter, actuator, circuitry, optional ratchets, and other optional elements. The example of FIG. 8 is but one configuration for a controller; other configurations can also be used.

In one example, multiple such controllers 800 are utilized in a distributed network to implement multiple components in a transaction based environment. An object-oriented, service-oriented, or other architecture may be used to implement such functions and communicate between the multiple controllers 800 and components.

One example of a controller 800, in the form of a computer 810, can include a processing unit 802, memory 804, removable storage 812, and non-removable storage 814. Memory 804 may include volatile memory 806 and non-volatile memory 808. Computer 810 may include, or have access to a computing environment that includes, a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a non-transitory computer-readable medium. For example, a computer program 822 with instructions for the computer 810, according to the teachings of the present disclosure, may be included on a CD-ROM and loaded from the CD-ROM to a hard drive. The computer-readable instructions allow computer 810 to provide generic access controls in a COM based computer network system having multiple users and servers.

In the foregoing detailed description, the method and apparatus of the present disclosure have been described with reference to specific embodiments thereof. It will, however, be evident that various modifications and changes may be made thereto without departing from the broader spirit and scope of the present disclosure. The present specification and figures are accordingly to be regarded as illustrative rather than restrictive.

To further illustrate the device and related method disclosed herein, a non-limiting list of examples is provided below. Each of the following non-limiting examples can stand on its own, or can be combined in any permutation or combination with any one or more of the other examples.

In Example 1, a self-service terminal can include: an interface device positioned on a housing and electrically coupled to the housing via a secure physical connection; a plurality of media readers integrated into the interface device; an encrypted touch-sensitive display integrated into the interface device and positioned on a front of the interface device, the touch-sensitive display configured to show a plurality of prompts to initiate a transaction at the self-service terminal, the prompts providing instructions for causing physical media to be read at any one of the plurality of media readers to produce identification data; and a processor positioned in the housing and configured to receive the identification data from the interface device via the secure physical connection.

In Example 2, the self-service terminal of Example 1 can optionally be configured such that the processor is further configured to automatically communicate data corresponding to the identification data to a server to allow access to an account associated with the physical media.

In Example 3, the self-service terminal of any one of Examples 1-2 can optionally be configured such that the self-service terminal is an automated teller machine that includes a cash recycler positioned in the housing; and the interface device includes a banknote slot that extends through the interface device from the front of the interface device to a back of the interface device, the banknote slot sized and positioned to transport banknotes to and from the cash recycler.

In Example 4, the self-service terminal of any one of Examples 1-3 can optionally be configured such that the physical media includes contactless media; the plurality of media readers includes a contactless media reader positioned on or in the interface device and accessible from the front of the interface device; and the plurality of prompts includes displaying, on the touch-sensitive display, a contactless media reader icon proximate the contactless media reader.

In Example 5, the self-service terminal of any one of Examples 1-4 can optionally be configured such that the physical media includes a card; the plurality of media readers includes a card reader positioned on or in the interface device proximate a card slot that extends into the interface device; and the plurality of prompts includes displaying, on the touch-sensitive display, instructions to insert the card into the card slot.

In Example 6, the self-service terminal of any one of Examples 1-5 can optionally be configured such that the card slot is accessible from a bottom of the interface device; and the card slot extends along a direction parallel to the front of the interface device.

In Example 7, the self-service terminal of any one of Examples 1-6 can optionally be configured such that the card slot is accessible from the front of the interface device; and the card slot extends along a direction orthogonal to the front of the interface device.

In Example 8, the self-service terminal of any one of Examples 1-7 can optionally further include an upper camera positioned on the front of the interface device, the upper camera configured to capture an upper video stream through the front of the interface device, the upper video stream having an upper field of view positioned to capture a face of a user of the self-service terminal.

In Example 9, the self-service terminal of any one of Examples 1-8 can optionally be configured such that the upper camera is positioned above the touch-sensitive display on the front of the interface device.

In Example 10, the self-service terminal of any one of Examples 1-9 can optionally further include a lower camera positioned on the front of the interface device, the lower camera configured to capture a lower video stream through the front of the interface device, the lower video stream having a lower field of view positioned to capture a hand of a user of the self-service terminal.

In Example 11, the self-service terminal of any one of Examples 1-10 can optionally be configured such that the lower camera is positioned below the touch-sensitive display on the front of the interface device.

In Example 12, the self-service terminal of any one of Examples 1-11 can optionally be configured such that the touch-sensitive display is further configured to show instructions during transactions at the self-service terminal and receive touch-selections during transactions at the self-service terminal.

In Example 13, the self-service terminal of any one of Examples 1-12 can optionally further include a private audio jack positioned on the interface device and configured to provide an audio signal for the visually impaired, the audio signal configured to mimic instructions shown on the touch-sensitive display.

In Example 14, the self-service terminal of any one of Examples 1-13 can optionally be configured such that the private audio jack is positioned on a bottom of the interface device.

In Example 15, the self-service terminal of any one of Examples 1-14 can optionally be configured such that the private audio jack is positioned on the front of the interface device.

In Example 16, the self-service terminal of any one of Examples 1-15 can optionally be configured such that the interface device is planar; and the interface device has a back, opposite the front, that is lockably and removably docked to the housing.

In Example 17, the self-service terminal of any one of Examples 1-16 can optionally be configured such that the interface device includes encryption to automatically render information stored on the interface device unreadable when the interface device is undocked from the housing.

In Example 18, the self-service terminal of any one of Examples 1-17 can optionally be configured such that the interface device includes authentication to automatically confirm an authenticity of the interface device when the interface device attaches to the housing.

In Example 19, in a method for initiating a transaction at a self-service terminal, the self-service terminal including an interface device positioned on a housing and electrically coupled to the housing via a secure physical connection, the self-service terminal including a plurality of media readers integrated into the interface device, the method can include: displaying, on an encrypted touch-sensitive display integrated into the interface device and positioned on a front of the interface device, a plurality of prompts to initiate a transaction at the self-service terminal, the prompts providing instructions for causing physical media to be read at any one of the plurality of media readers to produce identification data; directing the identification data from the interface device, via the secure physical connection, to a processor positioned in the housing; and automatically communicating data corresponding to the identification data from the processor to a server to allow access to an account associated with the physical media.

In Example 20, an automated teller machine can include: an interface device positioned on a housing and electrically coupled to the housing via a secure physical connection; a cash recycler positioned in the housing; a banknote slot that extends through the interface device from a front of the interface device to a back of the interface device, the banknote slot sized and positioned to transport banknotes to and from the cash recycler; an upper camera positioned on the front of the interface device, the upper camera configured to capture an upper video stream through the front of the interface device, the upper video stream having an upper field of view positioned to capture a face of a user of the self-service terminal; a lower camera positioned on the front of the interface device, the lower camera configured to capture a lower video stream through the front of the interface device, the lower video stream having a lower field of view positioned to capture a hand of a user of the self-service terminal; a plurality of media readers integrated into the interface device; an encrypted touch-sensitive display integrated into the interface device and positioned on a front of the interface device between the upper camera and the lower camera, the touch-sensitive display configured to show a plurality of prompts to initiate a transaction at the self-service terminal, the prompts providing instructions for causing physical media to be read at any one of the plurality of media readers to produce identification data; and a processor positioned in the housing and configured to receive the identification data from the interface device via the secure physical connection, the processor further configured to automatically communicate data corresponding to the identification data to a server to allow access to an account associated with the physical media.

What is claimed is:

1. A self-service terminal, comprising:
   an interface device positioned on a housing and electrically coupled to the housing via a secure physical connection;
   a plurality of media readers integrated into the interface device;
   an encrypted touch-sensitive display integrated into the interface device and positioned on a front of the interface device, the touch-sensitive display configured to show a plurality of prompts to initiate a transaction at the self-service terminal, the prompts providing instructions for causing physical media to be read at any one of the plurality of media readers to produce identification data;
   a lower camera positioned below the touch-sensitive display on the front of the interface device, the lower camera configured to capture a lower video stream through the front of the interface device, the lower video stream having a lower field of view positioned to capture a hand of a user of the self-service terminal; and a processor positioned in the housing and configured to receive the identification data from the interface device via the secure physical connection.

2. The self-service terminal of claim 1, wherein the processor is further configured to automatically communicate data corresponding to the identification data to a server to allow access to an account associated with the physical media.

3. The self-service terminal of claim 1, wherein:
the self-service terminal is an automated teller machine that includes a cash recycler positioned in the housing; and
the interface device includes a banknote slot that extends through the interface device from the front of the interface device to a back of the interface device, the banknote slot sized and positioned to transport banknotes to and from the cash recycler.

4. The self-service terminal of claim 1, wherein:
the physical media includes contactless media;
the plurality of media readers includes a contactless media reader positioned on or in the interface device and accessible from the front of the interface device; and
the plurality of prompts includes displaying, on the touch-sensitive display, a contactless media reader icon proximate the contactless media reader.

5. The self-service terminal of claim 1, wherein:
the physical media includes a card;
the plurality of media readers includes a card reader positioned on or in the interface device proximate a card slot that extends into the interface device; and
the plurality of prompts includes displaying, on the touch-sensitive display, instructions to insert the card into the card slot.

6. The self-service terminal of claim 5, wherein:
the card slot is accessible from a bottom of the interface device; and
the card slot extends along a direction parallel to the front of the interface device.

7. The self-service terminal of claim 5, wherein:
the card slot is accessible from the front of the interface device; and
the card slot extends along a direction orthogonal to the front of the interface device.

8. The self-service terminal of claim 1, further comprising an upper camera positioned on the front of the interface device, the upper camera configured to capture an upper video stream through the front of the interface device, the upper video stream having an upper field of view positioned to capture a face of a user of the self-service terminal.

9. The self-service terminal of claim 8, wherein the upper camera is positioned above the touch-sensitive display on the front of the interface device.

10. The self-service terminal of claim 1, wherein the touch-sensitive display is further configured to show instructions during transactions at the self-service terminal and receive touch-selections during transactions at the self-service terminal.

11. The self-service terminal of claim 10, further comprising a private audio jack positioned on the interface device and configured to provide an audio signal for the visually impaired, the audio signal configured to mimic instructions shown on the touch-sensitive display.

12. The self-service terminal of claim 11, wherein the private audio jack is positioned on a bottom of the interface device.

13. The self-service terminal of claim 11, wherein the private audio jack is positioned on the front of the interface device.

14. A self-service terminal comprising:
an interface device positioned on a housing and electrically coupled to the housing via a secure physical connection;
a plurality of media readers integrated into the interface device;
an encrypted touch-sensitive display integrated into the interface device and positioned on a front of the interface device, the touch-sensitive display configured to show a plurality of prompts to initiate a transaction at the self-service terminal, the prompts providing instructions for causing physical media to be read at any one of the plurality of media readers to produce identification data; and
a processor positioned in the housing and configured to receive the identification data from the interface device via the secure physical connection;
wherein:
the interface device is planar; and
the interface device has a back, opposite the front, that is lockably and removably docked to the housing.

15. The self-service terminal of claim 14, wherein the interface device includes encryption to automatically render information stored on the interface device unreadable when the interface device is undocked from the housing.

16. The self-service terminal of claim 14, wherein the interface device includes authentication to automatically confirm an authenticity of the interface device when the interface device attaches to the housing.

17. A method for initiating a transaction at a self-service terminal, the self-service terminal including an interface device positioned on a housing and electrically coupled to the housing via a secure physical connection, the interface device being planar, the interface device having a front, the interface device having a back, opposite the front, that is lockably and removably docked to the housing, the self-service terminal including a plurality of media readers integrated into the interface device, the method comprising:
displaying, on an encrypted touch-sensitive display integrated into the interface device and positioned on a front of the interface device, a plurality of prompts to initiate a transaction at the self-service terminal, the prompts providing instructions for causing physical media to be read at any one of the plurality of media readers to produce identification data;
directing the identification data from the interface device, via the secure physical connection, to a processor positioned in the housing; and
automatically communicating data corresponding to the identification data from the processor to a server to allow access to an account associated with the physical media.

18. An automated teller machine, comprising:
an interface device positioned on a housing and electrically coupled to the housing via a secure physical connection;
a cash recycler positioned in the housing;
a banknote slot that extends through the interface device from a front of the interface device to a back of the interface device, the banknote slot sized and positioned to transport banknotes to and from the cash recycler;
an upper camera positioned on the front of the interface device, the upper camera configured to capture an upper video stream through the front of the interface device, the upper video stream having an upper field of view positioned to capture a face of a user of the self-service terminal;
a lower camera positioned on the front of the interface device, the lower camera configured to capture a lower video stream through the front of the interface device, the lower video stream having a lower field of view positioned to capture a hand of a user of the self-service terminal;
a plurality of media readers integrated into the interface device;
an encrypted touch-sensitive display integrated into the interface device and positioned on a front of the interface device between the upper camera and the lower camera, the touch-sensitive display configured to show a plurality of prompts to initiate a transaction at the self-service terminal, the prompts providing instructions for causing physical media to be read at any one of the plurality of media readers to produce identification data; and
a processor positioned in the housing and configured to receive the identification data from the interface device via the secure physical connection, the processor further configured to automatically communicate data corresponding to the identification data to a server to allow access to an account associated with the physical media.

* * * * *